United States Patent [19]

Maruyama

[11] Patent Number: 5,532,847
[45] Date of Patent: Jul. 2, 1996

[54] DUPLEX DOCUMENT FEEDER FOR A FACSIMILE MACHINE

[75] Inventor: Ohji Maruyama, Shinagawa-ku, Japan

[73] Assignee: Ricoh Company, Ltd., Tokyo-to, Japan

[21] Appl. No.: 361,533

[22] Filed: Dec. 22, 1994

[30] Foreign Application Priority Data

Dec. 22, 1993 [JP] Japan ................................. 5-324424

[51] Int. Cl.$^6$ ........................... H04N 1/04; G03G 21/00; B65H 29/00
[52] U.S. Cl. .................. 358/498; 358/496; 355/313; 355/318; 355/320; 355/321; 355/322; 271/3.01; 271/186
[58] Field of Search ........................ 358/496, 498, 358/296; 355/320, 321, 322, 313, 318; 271/3.01, 165, 186

[56] References Cited

U.S. PATENT DOCUMENTS

| | | | |
|---|---|---|---|
| 4,814,798 | 3/1989 | Fukae et al. | 346/160 |
| 4,860,110 | 8/1989 | Kokubu | 358/400 |
| 4,897,831 | 1/1990 | Negi et al. | 370/29 |
| 4,908,719 | 3/1990 | Nonoyama | 358/494 |
| 4,949,189 | 8/1990 | Ohmori | 358/474 |
| 5,057,938 | 10/1991 | Edamura | 358/406 |
| 5,124,809 | 6/1992 | Koishikawa | 358/400 |
| 5,157,521 | 10/1992 | Chung | 358/498 |
| 5,257,081 | 10/1993 | Kato et al. | 355/324 |
| 5,258,818 | 11/1993 | Sundquist et al. | 355/321 |
| 5,282,050 | 1/1994 | Ishizuka et al. | 358/400 |
| 5,317,372 | 5/1994 | Nakabayashi et al. | 355/311 |

FOREIGN PATENT DOCUMENTS

64-17557    1/1989   Japan .
2-193156(A) 7/1990   Japan .

Primary Examiner—Edward L. Coles, Sr.
Assistant Examiner—Kimberly A. Williams
Attorney, Agent, or Firm—Oblon, Spivak, McClelland, Maier & Neustadt

[57] ABSTRACT

A controller of a facsimile machine controls a duplex document feeder (DDF) so that both sides of duplex pages are read by the scanner in the proper order and the data read from the duplex documents is sent by the facsimile machine in the proper order. The controller of the facsimile machine further controls the DDF so that jammed pages are read in the proper order by the scanner during the recovery mode and the data read therefrom is properly sent by the facsimile machine in the case of a jam occurrence. The controller of the facsimile machine further controls the DDF so that a back side of the covering letter is not read by the scanner in the duplex document mode. An image data converter converts the data of the image read from every other page so that the direction of the image of all of the facsimile copies received by the recipient is the same.

12 Claims, 7 Drawing Sheets

DUPLEX DOCUMENT FEEDER FOR A FACSIMILE MACHINE

BACKGROUND OF THE INVENTION

1. Field of the Invention

The present invention relates to an improvement of a duplex document feeder for a facsimile machine and other machines.

2. Description of the Related Prior Art

In the conventional facsimile machine, a document feeder is designed only to feed one-sided documents. Therefore when information on both sides of the pages is to be sent in order, an operator must make one-sided copies of each of the pages of the duplex documents beforehand, and send the newly made single-sided pages by the facsimile machine.

SUMMARY OF THE INVENTION

The present invention was made in consideration of the above matters. According to the present invention, a controller of the facsimile machine controls the duplex document feeder (DDF) so that both sides of the pages of duplex documents are read in the proper order by a scanner and the data read from the duplex documents are sent by the facsimile machine in the proper order.

The controller of the facsimile machine further controls the DDF so that the jammed document is read in order of the pages of the documents by the scanner during the recovery mode and sends the data read therefrom by the facsimile in the proper order.

The controller of the facsimile machine further controls the DDF so that the back side of the cover sheet is not read by the scanner in the duplex mode.

An image data converter converts the data of the image which is read from every other page of the documents, so that the direction of the image on the received facsimile copies is proper.

DETAILED DESCRIPTION OF THE PREFERRED EMBODIMENT

Figure 1:
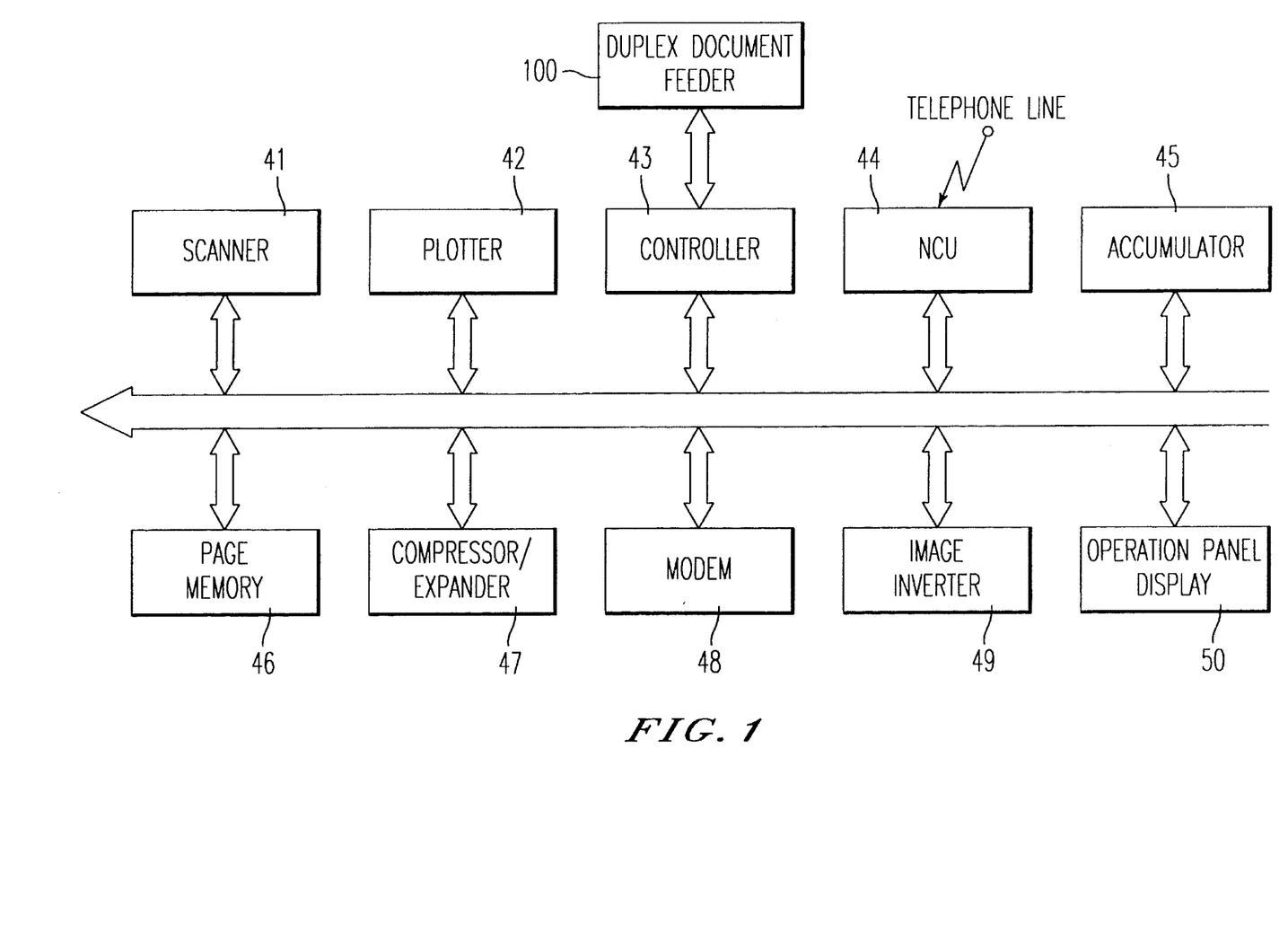
FIG. 1 is a block diagram of the facsimile machine of the present invention.
Figure 2:
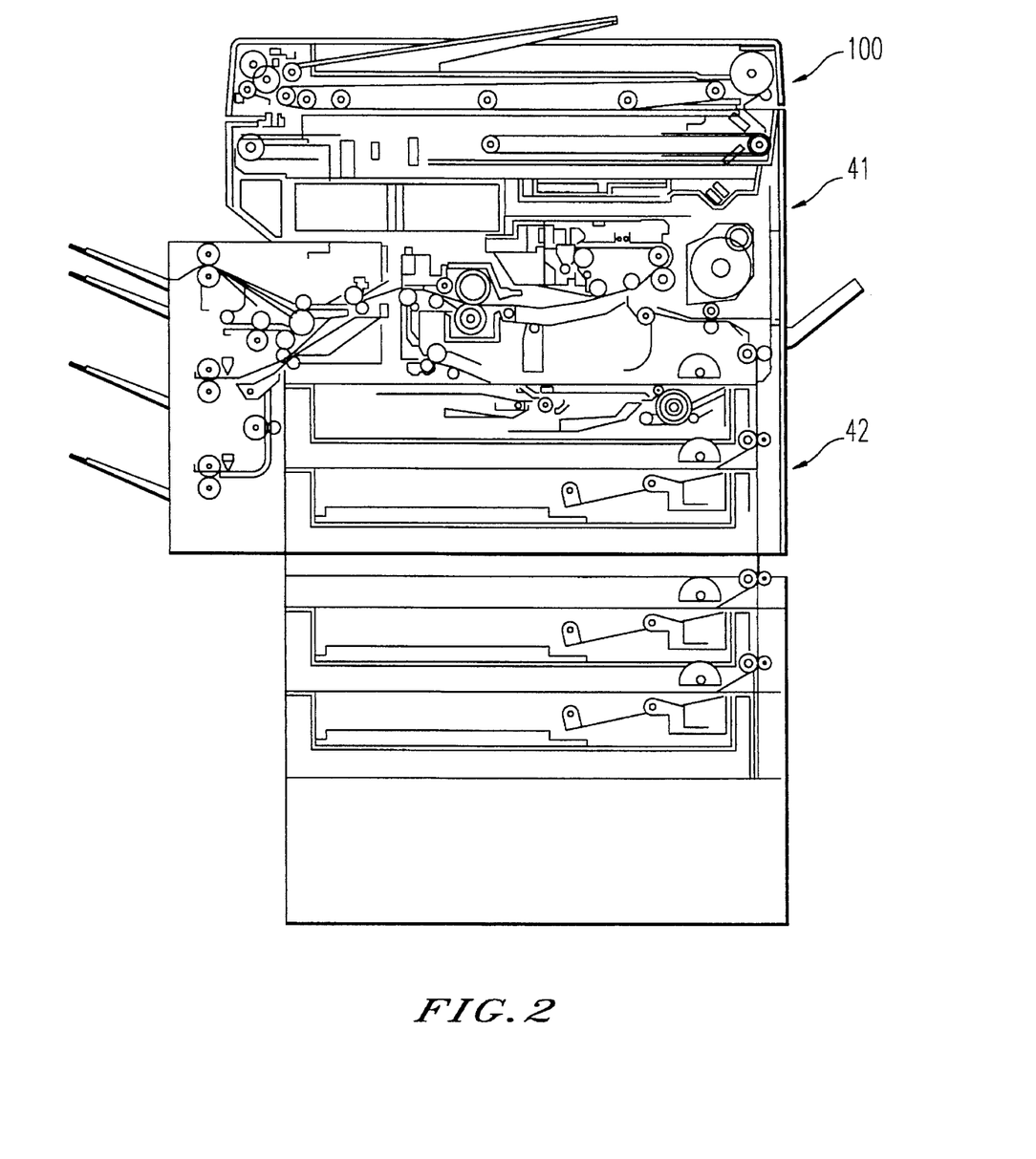
FIG. 2 is a sectional view of the facsimile machine of the present invention.
Figure 3:
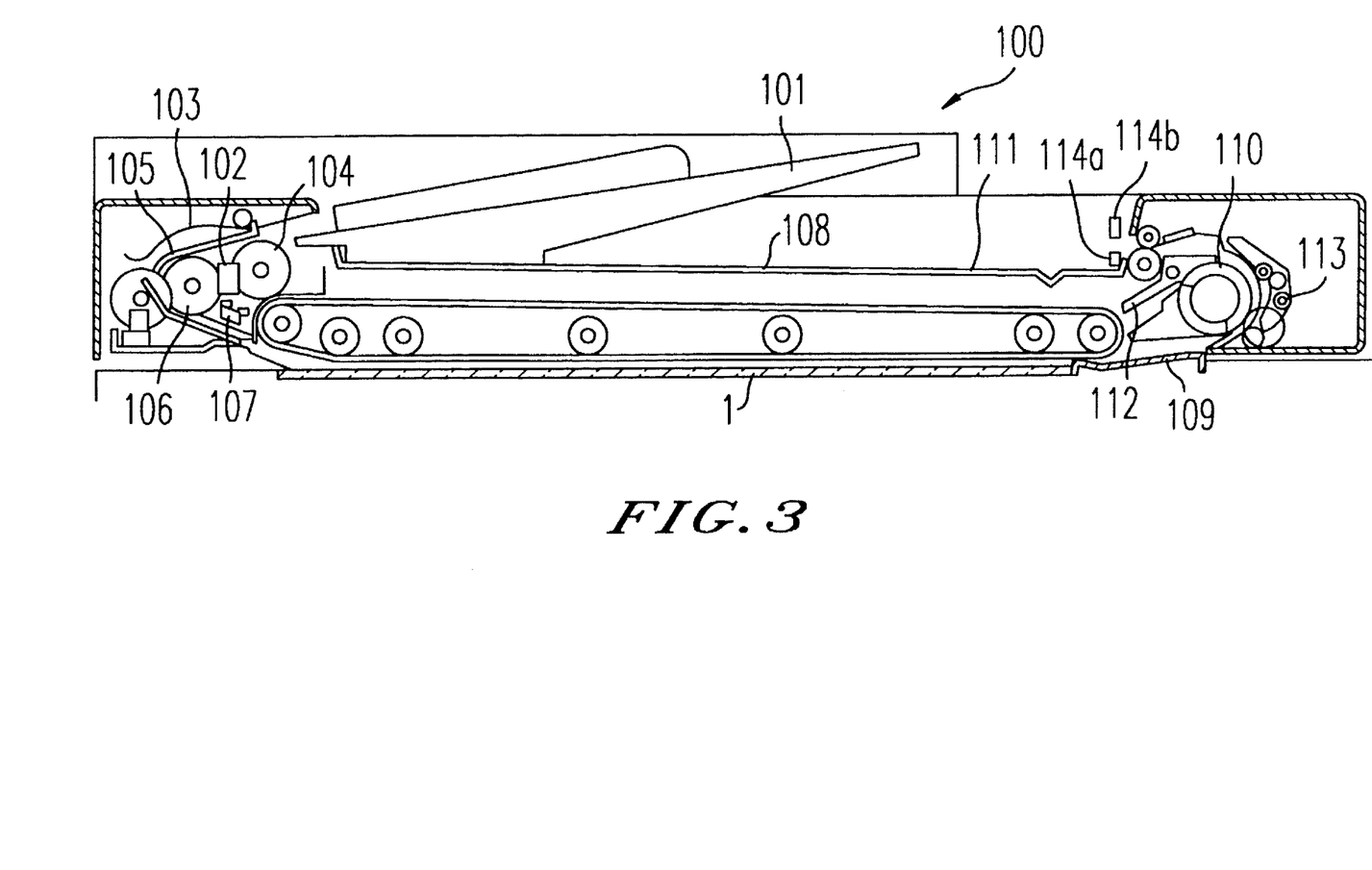
FIG. 3 is a sectional view of the duplex document feeder of the facsimile machine of the present invention.

The embodiment of the present invention is described hereinafter referring to the accompanying drawings. In FIGS. 1, 2 and 3, a scanner 41 reads original documents having an image on one side thereof or both sides thereof. A plotter 42 plots or prints images on facsimile paper according to digital data obtained from the original documents. Further explanation of the detail thereof is omitted because both the scanner 41 and the plotter 42 are well known to the person having ordinary skill in the art. A controller 43 controls the facsimile machine. In particular, as shown in FIG. 1, the controller 43 controls a duplex document feeder 100 either to invert the document or not during reading of duplex documents, and controls a jam recovery process. The controller 43 further controls whether or not to execute an inversion process on image data read from one side of the duplex documents before sending thereof by the facsimile machine. Further, the controller 43 controls the facsimile machine to inhibit the sending of the data of the back side of the cover sheet when the cover sheet does not have information on the back side thereof and is read before the original document is read when the facsimile machine is in a duplex document mode, which is described later in detail.

A NCU (Network control unit) 44 controls connecting and disconnecting the facsimile machine to the public telephone network, and generates a selection signal and detects an arrival of the signal from another facsimile machine. An accumulator 45 accumulates compressed signal data both at the time the signals stored in a memory are sent and the time it receives the signal data from the other facsimile when a plotter is working. A page memory 46 stores both image information read by the scanner 41 and the information to be plotted by the plotter 42 in increments of one page. A compressing and/or expanding device 47 compresses and/or expands the received image signal. A MODEM 48 modulates the signal compressed by the compressing and/or expanding device 47 at the time of sending the signal, and de-modulates the signal of the arriving data and inputs the signal to the compressing and/or expanding device 47. An image inverting device 49 inverts the image by controlling a reading-out address for the image data stored in the page memory 46. An operation panel and display 50 is composed of a variety of keys, having at least setting keys for a single-side document feeding mode and for a duplex document feeding mode.

Hereinafter, a structure of the duplex document feeder 100 is explained in detail in reference to FIG. 3. A set of pages of an original document, not shown in the figures is set on the left side of a table 101. Thereby, a sensor 102 detects the original document and a display-light, not shown in the figures, goes out. In this stage, if a start key, not shown in the figures, is pressed, a lever 103 disposed in the vicinity of the document feeding path contacts a feeding roller 104. After that, if the motor, not shown in the figures, starts driving, an original page is separated and fed by a separating belt 105 and separating roller 106 from the bottom of the page stack.

The original page, passed around the separating roller 106, is turned to be up side down and is further fed onto a contact glass 1 through a registration plate and a detecting device 107 for detecting the width of the document. If a single-sided document mode is set, the motor stops just after the original page arrives at a stopper 109 disposed at the side of the contact glass 1 and reading (exposing) of the original page is executed by scanner 41. After that, if a documentexchange command is outputted by the controller 43, an ejecting motor, not shown in the figures, is driven and, at same time, the stopper 109 protruding to the document path is withdrawn downwardly. Thereby, the original page read is ejected from the contact glass 1 and is exchanged with a next one.

In the document ejecting path, there is an inverting roller 110 which rotates in a counter-clockwise direction to invert the original page ejected from the contact glass 1 to be up-side-down before being ejected to the document tray 111. After that, the page is detected by a sensor 113 and a stamper 114b stamps a mark indicative of completion of the reading (exposure) of the document. Thereafter, the document is ejected on the document receiving tray 111 in the state that the face read by the scanner at the platen glass is facing up. Therefore, in the single-sided mode, if the first page of the original document stacked is set in the state of facing up on the document table 101, the last page of the original document is fed first to the glass 1 and read, and after that it is ejected to the document receiving tray 111. Thereby, the original pages are stacked on the receiving tray 111 in the state that the first page thereof is facing up.

Hereinafter, a duplex document mode, where documents having image data on both sides of the pages is explained in detail. First, a case where the document is stacked on the table 101 such that the pages are in order and the first page thereof is facing up, is explained. The lowermost page is fed first from the stack on the table 101 and passes in front of the contact glass 1 without executed the reading (exposing) thereof because, the bottom side of the last page of the document is facing away from the contact glass 1. The page is further fed and passes under an inverting and switching guide 112 directing the page upwardly, and inverting the page by a feeding roller 110 rotating then in a clockwise direction. Thereby, the document is set on the contact glass 1 and executed reading (exposing) of the back side of the last page of the document occurs.

After the reading (exposing) of the page of the document, the same is ejected from the contact glass 1 and inverted to be up-side-down again by the roller 110 rotating counter-clockwise. Thereby, the page is again set on the contact glass 1 and the other side (front) of the page is read. After reading thereof, the document is ejected from the contact glass 1 and is inverted by the feeding roller 110. Finally, the document is ejected on the document receiving tray 111 in the state that the bottom of the last page is facing down. Before ejection onto the document receiving tray 111, the page is detected by the sensor 113 and the mark indicative of completion of the reading (exposing) of the side of the document is put on the side or both sides of the documents by the stampers 114a and/or 114b when the sensor 113 generates a detection signal.

Figure 4A:
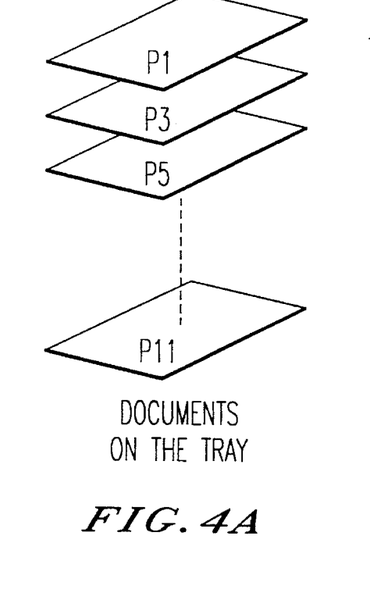
FIG. 4 is a pictorial view showing the order of reading duplex original documents, when the first page is facing up.
Figure 4B:
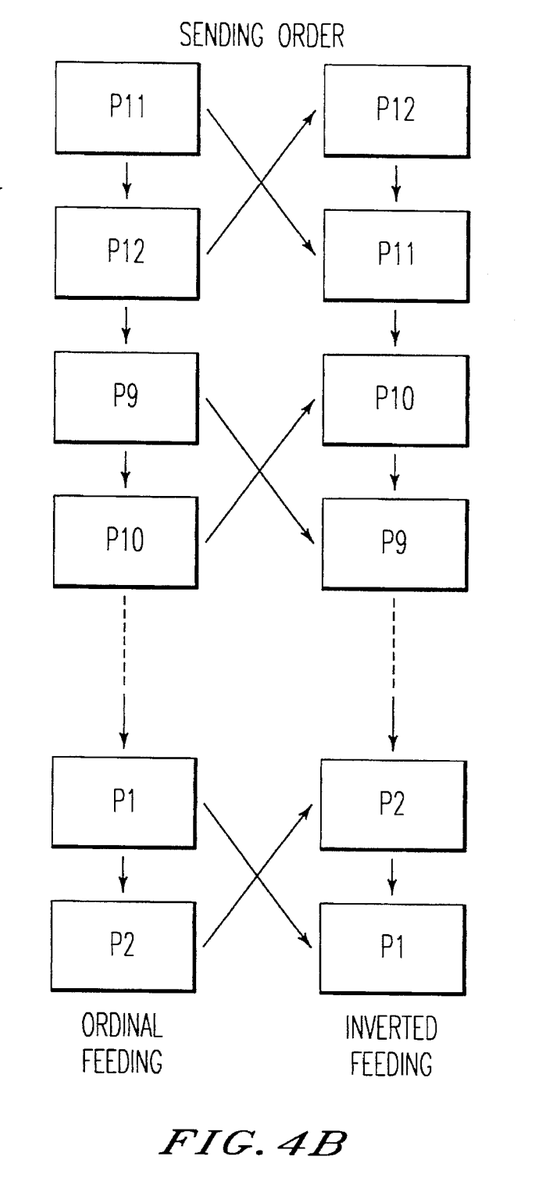

According to the above description, if each of the pages is stacked on the document table 101 in the state that the first page is facing up, reading of the document is started from the last page to the first page shown in FIG. 4. The data read therefrom is sent in the same order as it was read. On the other hand, if each of the pages is stacked on the document table 101 in the state that the first page thereof is facing down, the pages are read from the first page to the last page and the data read therefrom is sent in the same order as it was read.

Hereinafter, a detailed description of the mode in which the document is set on the document table 101 in the state that the first page of the document is facing down is explained. In particular, a jam recovery mode is explained first. If a jam of the pages of the document occurs, a sensor, not shown in the figures, detects the same and judges whether it occurred before reading an odd page or even page of the document. The results of the detection is stored in a memory, not shown in the figures. After the jammed document is removed, the same is reset on the document table 101 in the proper order and fed again toward the contact glass 1, after a start key for starting the document feeder is operated by an operator.

If the data stored in the memory indicates a jamming of an odd numbered page, the jammed page is inverted by the roller 110 to be up-side-down before reading thereof, as executed in the duplex document mode. On the other hand, if the data stored in the memory indicates a jamming of an even page, the jammed page is fed and set on the platen glass 1 without being inverted by the roller 100, as executed in the single-sided document mode. Thereby, no matter when the jam occurs, the reading of the consecutive original pages is executed in the proper order during the jam recovery mode.

Hereinafter, inverting of the image data read from the pages is explained in detail. As shown in FIG. 3, in the DDF 100, the original document is inverted by the roller 110 to be up-side-down, and the image data for every other page stored in the page memory 46 is opposite to the others. Therefore, if the data is sent in the state of such condition, inconsistent facsimile copies, namely up-side-down copies will be produced by the recipient side facsimile machine. In order to prevent this problem, a process is performed which addresses the page memory reversely for every other page. Thereby, the data for every other page is rotated by 180°.

As shown in FIG. 3, a pair of the stampers 114a and 114i is provided adjacent to the ejecting path for the document. Each of the stampers puts a mark, which is indicative of completion of the reading of the document, on the respective side thereof. In a single-sided document mode, when data on one side of the document is sent by the facsimile, the mark is put on the side of the document by one of the stampers 114a and 114b. However, in a duplex document mode, where data on both sides of the document is sent by the facsimile, the marks are put on both the respective sides of the document by each of the stampers 114a and 114b. Therefore, if document misfeeding occurs either in the simplex mode or the duplex mode, an operator can easily recognize the occurrence of jamming in either mode. Furthermore, the stampers can be selectively utilized by the operator by operating a selecting key, not shown in the figures.

Hereinafter, a mode in which a cover sheet attached to a document as a front page is sent by the facsimile is explained. Customarily, a back side of the cover sheet is blank. Therefore, if both sides of the cover sheet are read by the scanner and sent by the facsimile machine, there exists a waste of the facsimile paper at the recipient side and a waste of fees for the public telephone line at the sender side. To solve this problem, a cover sheet mode is engaged which is selectively set by the operator by operating a key, not shown in the figures.

In the above-mentioned mode, the facsimile is controlled as mentioned below. Namely, if pages of a document to be sent include a cover sheet or letter and a duplex mode is set, only the first side of the cover sheet is read which includes a recipient name, etc., without reading the back side thereof. After the front page of the cover letter is read, the same is ejected onto the document receiving tray 111 without being inverted and set again on the contact glass 1. After that, the first side and second side of the pages of the document are read and sent in order.

Figure 5A:
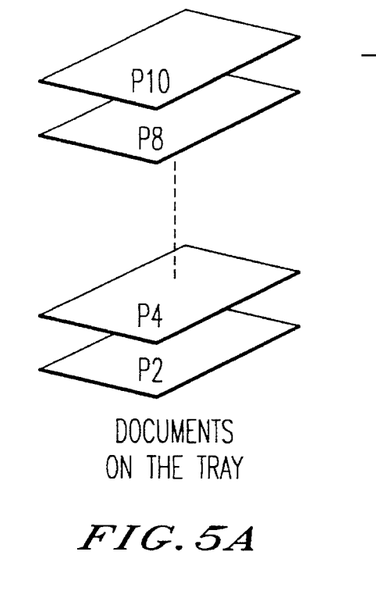
FIG. 5 is a pictorial view showing the order of reading two-sided original documents, when the first page is facing down.
Figure 5B:
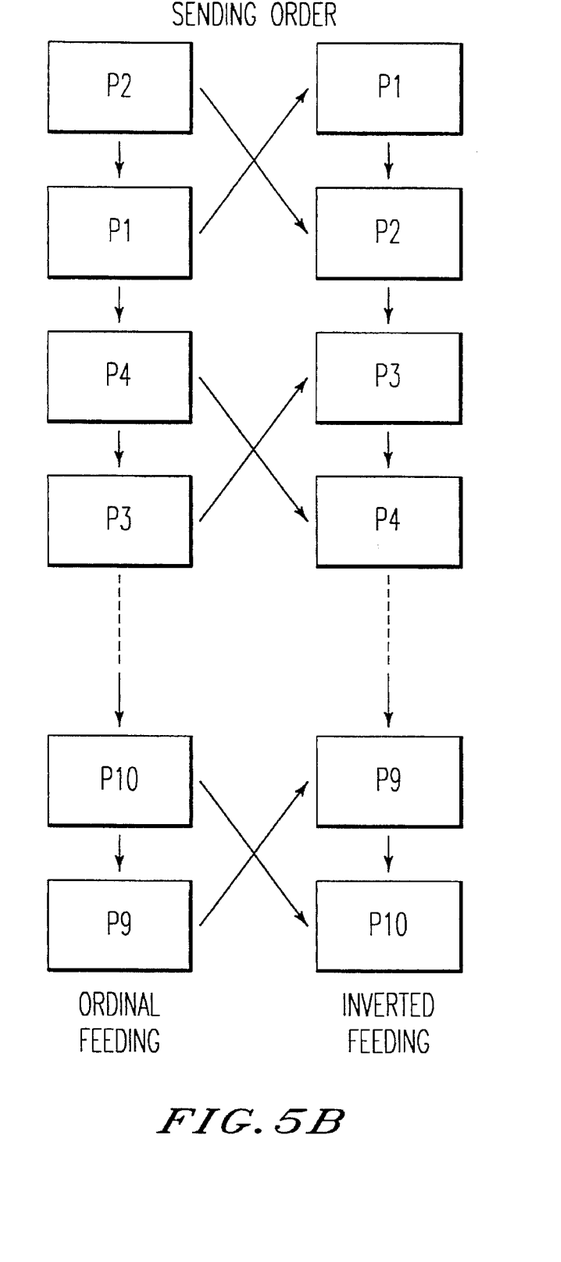
Figure 6A:
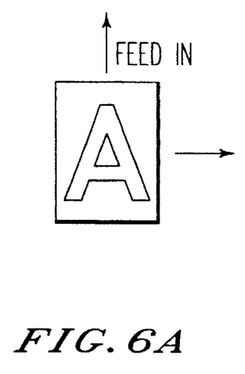
FIG. 6 is a pictorial view showing direction of travel of a letter during feeding, scanning and storing in memory, when scanning is begun from the bottom side of a page.
Figure 6B:
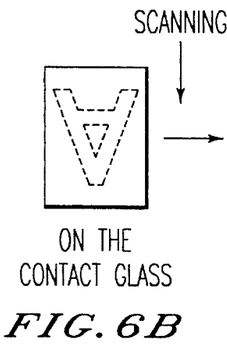
Figure 6C:
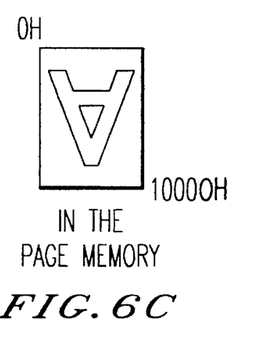
Figure 7A:
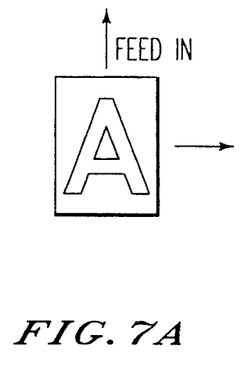
FIG. 7 is a pictorial view showing the direction of feeding of a letter during feeding, scanning and storing in memory, when the scanning is executed from the top side of the a page.
Figure 7B:
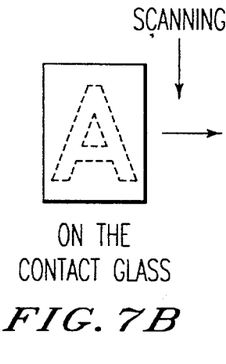
Figure 7C:
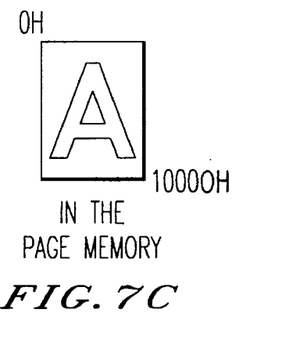
Figure 8A:
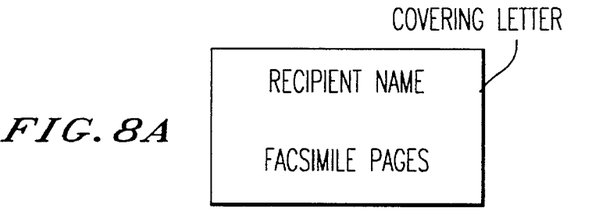
FIG. 8 is a pictorial view showing the cover sheet and facsimile document.
Figure 8B:
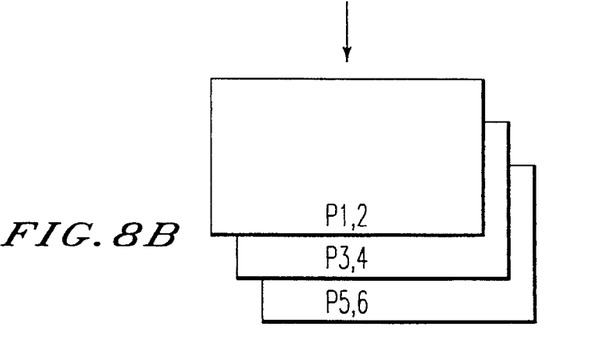

A document stacking direction setting key can be provided in the facsimile machine of the present invention. This key selectively sets either a mode where the first page of the document is set upwardly by a user on the document table 101 as shown at the left side of FIG. 4, where the first page of the document of the document is set downwardly by a user as shown at the left side of FIG. 5. If the former mode is set and a cover sheet is included in the document and a duplex document is to be transmitted, the back side of the cover sheet is not read and therefore not sent by the facsimile machine.

Figure 9:
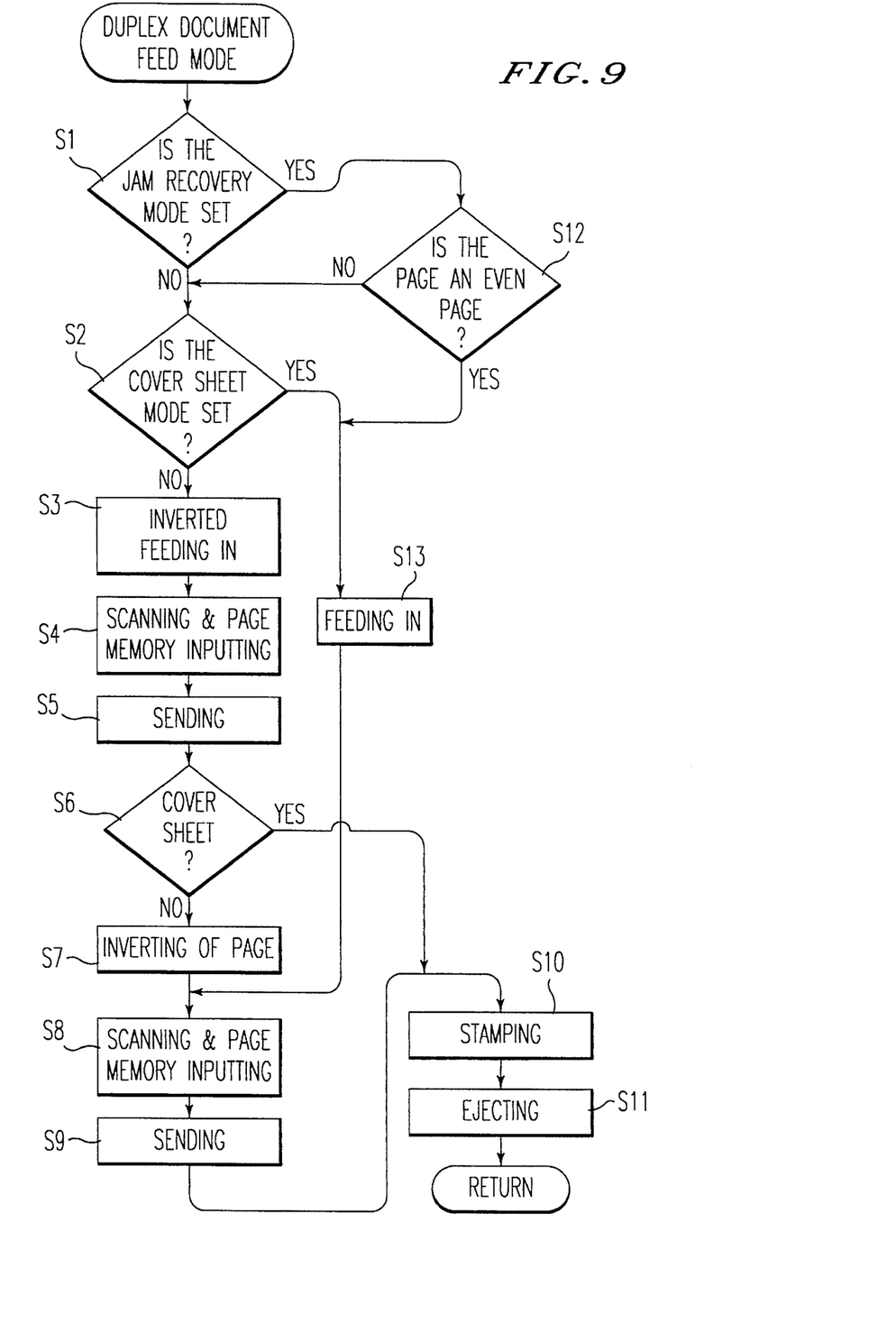
FIG. 9 is a flow chart showing steps of the operation of the facsimile machine of the present invention.

Hereinafter, each step of the duplex scanning of a document to be transmitted by the facsimile machine is explained referring to FIG. 9. Step S1 determines whether or not the jam recovery mode is set. If the jam recovery mode is not set, then step S2 determines if the cover sheet mode is set. If the cover sheet mode is determined not to be set in step S2, then step S3 performs an inverse feeding of a page on the table.

On the other hand, if step S1 determines that the jam recovery mode is set, step S12 determines whether or not the document page is an even page. If step S12 determines that the page is not an even page, step S2 is executed. On the other hand, if step S12 determines that the page is an even page, the page is fed without being inverted in step S13.

When a page is fed in an inverted manner and a jam does not occur before reading thereof by the scanner, the image data read from the page is stored in the page memory 46 in step S4, and sent by the facsimile machine after the image data is rotated by the angle of 180° in step S5.

Step S6 examines if the page is a cover sheet. If it is not a cover sheet, step S7 is executed which inverts the page. The page is then scanned and the image thereof is stored in the page memory 46. Step S9 sends the page by the facsimile without rotating the page by 180°. After that, the mark indicative of completion of the reading of one side of the document is stamped by both of the stampers 114a and 114b on each of the surfaces of the document in step S10, and the document is ejected from the facsimile in step S11. In case that a cover sheet is determined to exist in step S6, the mark is stamped by the stamper 114a on the surface thereof in step S10 and ejected in step S11 from the facsimile without being read regarding to the back side thereof.

According to the present invention, a plurality of pages having duplex images thereon can be read and sent in the proper order.

Further, even if a jam has occurred during reading of the duplex pages, the document can be read in the proper order in the jam recovery mode after the jammed document is removed. Additionally even if every other page is inverted during the reading of the back side (odd pages or even pages), the direction of the images on each of the facsimile copy sheets received by the recipient can be equalized. Further, the cost for telephone communication can be minimized, and a waste of facsimile paper can be avoided by the recipient in the case when a cover sheet is sent.

What is claimed is:

1. A facsimile device, comprising: an automatic document feeder for feeding pages from a document table to a document ejecting tray in front of a contact glass;

a first inverting means, disposed in a document path between said document table and said contact glass, for inverting a page fed from said document table;

a second inverting means, disposed adjacent to said contact glass for inverting said page ejected from said contact glass and feeding said page to said contact glass again;

a reading means for reading each side of pages fed onto said contact glass;

a sending means for sending image data obtained from each of said pages by said reading means;

a duplex document mode setting means for setting a mode in which two sided documents are read in order of the pages thereof, and disposed on said facsimile device; and a control means which performs a control process such that each of said pages is inverted by the first and second inverting means before reading one side of said page by said reading means at said contact glass, and is inverted again by said second inverting means and another side therefore is read by said reading means after said reading of one side thereof is completed, and further inverted by said second inverting means after reading said another side thereof when said duplex document mode is set.

2. A facsimile device as claimed in claim 1, further comprising:

a jam recovery mode setting means for setting a jam recovery mode, in which jammed pages which have been previously read are fed again from said document table to said contact glass to be read by said reading means;

a detecting means for detecting whether a side of a page to be read is even or odd numbered; and a memory for storing a result of said detecting by said detecting means, wherein said control means operates such that:

said jammed document is fed onto said contact glass and inverted by only said first inverting means before reading thereof, when said result stored in said memory indicates an odd numbered page; and said jammed document is fed onto said contact glass and inverted by both said first inverting means before reading thereof, when said result stored in said memory indicates an even numbered page.

3. A facsimile device as claimed in claim 1, further comprising:

an image data inverting means for electronically inverting image data obtained from said document by said reading means by an angle of 180° ;

wherein:

said image data inverting means inverts said image data of every other page of said pages.

4. A facsimile device as claimed in claim 1, further comprising:

a pair of stampers for stamping a mark on each of side of said pages after reading thereof is completed wherein:

said pages are stamped by said pair of stampers on both sides thereof in said duplex document mode.

5. A facsimile device as claimed in claim 1, further comprising:

a cover sheet mode setting means for setting a mode in which a cover sheet without an image on a back side thereof is fed before a feeding of other pages of the document;

wherein said control means performs the control process such that a facsimile transmission occurs without transmitting image data of said back side of said cover sheet.

6. A facsimile device as claimed in claim 5, wherein:

said control means controls said automatic document feeder to eject said cover sheet to said document ejecting tray after one side thereof is read by said reading means without inverting and feeding thereof again onto said contact glass.

7. A facsimile device as claimed in claim 5, further comprising:

a document orientation setting means for selectively setting a first document orientation mode in which a document including a stack of pages is set on said document table in a manner such that a first page of said document is facing down, or a second document orientation mode in which a document including a stack of pages is set on said document table in a manner such that a first page of said document is facing up, wherein:
said control means controls inhibiting a reading of the back side of said cover sheet when said cover sheet mode is set.

8. A method of transmitting a facsimile, comprising the steps of:

feeding a page by a document feeder;

inverting the page fed from the document feeder;

inverting the page a second time;

scanning a first side of said page to obtain first image data, after said page has been inverted a second time;

inverting said page a third time;

scanning a second side of said page to obtain second image data, after said page has been inverted a third time;

inverting said page a fourth time and ejecting said page; and transmitting said first and second image data.

9. A method of transmitting a facsimile, comprising the steps of:

setting a cover sheet mode and duplex mode in a facsimile device;

scanning only a front side of a cover sheet without scanning a back side of said cover sheet to obtain cover sheet data;

transmitting the cover sheet data;

scanning a first side of a page following said cover sheet and obtaining first data;

transmitting the first data;

scanning a second side of said page following the cover sheet and obtaining second data; and transmitting the second data.

10. A facsimile apparatus, comprising:

means for setting a cover sheet mode and duplex mode;

means for scanning only a front side of a cover sheet without scanning a back side of said cover sheet to obtain cover sheet data;

means for transmitting the cover sheet data;

means for scanning a first side of a page following said cover sheet and obtaining first data;

means for transmitting the first data;

means for scanning a second side of said page following the cover sheet and obtaining second data; and means for transmitting the second data.

11. An apparatus for transmitting a facsimile, comprising:

means for feeding a page by a document feeder;

means for inverting the page fed from the document feeder;

means for inverting the page a second time;

means for scanning a first side of said page to obtain first image data, after said page has been inverted a second time;

means for inverting said page a third time;

means for scanning a second side of said page to obtain second image data, after said page has been inverted a third time;

means for inverting said page a fourth time and ejecting said page; and means for transmitting said first and second image data.

12. An apparatus according to claim 11, wherein said means for inverting said page a second time, said means for inverting the page a third time, and said means for inverting said page a fourth time each include a same roller and a same switch guide.

* * * * *